(12) United States Patent
Hirschmann

(10) Patent No.: US 12,735,614 B2
(45) Date of Patent: Sep. 15, 2026

(54) METHOD FOR PRODUCING ABRASIVE PARTICLES

(71) Applicant: Tyrolit—Schleifmittelwerke Swarovski K.G., Schwaz (AT)

(72) Inventor: Martin Hirschmann, Wattenberg (AT)

(73) Assignee: TYROLIT—SCHLEIFMITTELWERKE SWAROVSKI K.G., Schwaz (AT)

( * ) Notice: Subject to any disclaimer, the term of this patent is extended or adjusted under 35 U.S.C. 154(b) by 1015 days.

(21) Appl. No.: 17/941,634

(22) Filed: Sep. 9, 2022

(65) Prior Publication Data

US 2023/0002655 A1 Jan. 5, 2023

Related U.S. Application Data

(63) Continuation of application No. PCT/AT2021/060057, filed on Feb. 22, 2021.

(30) Foreign Application Priority Data

Mar. 11, 2020 (AT) .............................. A 50201/2020

(51) Int. Cl.
*C09K 3/14* (2006.01)
*B24D 3/06* (2006.01)
(Continued)

(52) U.S. Cl.
CPC .............. *C09K 3/1418* (2013.01); *B24D 3/06* (2013.01); *B28B 3/20* (2013.01); *B28B 11/16* (2013.01);
(Continued)

(58) Field of Classification Search
CPC .......... C09K 3/1418; B24D 3/06; B28B 3/20; B28B 11/16; B28B 11/243; B29C 48/345;
(Continued)

(56) References Cited

U.S. PATENT DOCUMENTS 3,933,959 A 1/1976 Skochdopole et al.
5,009,676 A 4/1991 Rue et al.
(Continued)

FOREIGN PATENT DOCUMENTS

CN 1081948 2/1994
DE 690 29 421 5/1997
(Continued)

OTHER PUBLICATIONS

International Search Report issued Apr. 30, 2021 in corresponding International Application No. PCT/AT2021/060057.

*Primary Examiner* — Pegah Parvini
(74) *Attorney, Agent, or Firm* — Wenderoth, Lind & Ponack, L.L.P.

(57) ABSTRACT

A method for producing abrasive particles includes preparing a starting mixture containing at least aluminium hydroxide, which mixture can be converted at least into aluminium oxide by means of heat treatment; extruding the starting mixture to form an extrudate; separating the extrudate into intermediate particles; and heat-treating the intermediate particles. The intermediate particles are converted into abrasive particles that contain aluminium oxide, and the extrudate and/or the intermediate particles is/are subjected to an input of energy that is asymmetrical with respect to the geometry of the extrudate and/or the intermediate particles.

23 Claims, 6 Drawing Sheets

(51) Int. Cl.

| | |
|---|---|
| ***B28B 3/20*** | (2006.01) |
| ***B28B 11/16*** | (2006.01) |
| ***B28B 11/24*** | (2006.01) |
| ***C01F 7/442*** | (2022.01) |

(52) U.S. Cl.
CPC ............ *B28B 11/243* (2013.01); *C01F 7/442* (2013.01); *C01P 2004/30* (2013.01); *C01P 2004/61* (2013.01)

(58) Field of Classification Search
CPC ... B29C 48/0022; B29C 48/022; B29C 48/04; B29C 48/05; C01F 7/442
See application file for complete search history.

(56) References Cited

U.S. PATENT DOCUMENTS

| | | | |
|---|---|---|---|
| 5,194,072 | A | 3/1993 | Rue et al. |
| 5,201,916 | A | 4/1993 | Berg et al. |
| 5,244,477 | A | 9/1993 | Rue et al. |
| 5,304,331 | A | 4/1994 | Leonard et al. |
| 5,366,523 | A | 11/1994 | Rowenhorst et al. |
| RE35,570 | E | 7/1997 | Rowenhorst et al. |
| 5,984,988 | A | 11/1999 | Berg et al. |
| 7,104,160 | B2 | 9/2006 | Fries et al. |
| 11,649,388 | B2 | 5/2023 | Yener et al. |
| 11,859,120 | B2 | 1/2024 | Yener et al. |
| 2004/0093989 | A1 | 5/2004 | Fries et al. |
| 2023/0272254 | A1 | 8/2023 | Yener et al. |
| 2023/0357617 | A9 | 11/2023 | Yener et al. |

FOREIGN PATENT DOCUMENTS

| | | | | |
|---|---|---|---|---|
| EP | 3342839 | * | 11/2017 | ............... C09K 3/14 |
| GB | 799378 | | 8/1958 | |
| GB | 1 590 436 | | 6/1981 | |
| KR | 10-0139203 | | 4/1998 | |
| KR | 10-2014-0123058 | | 10/2014 | |
| WO | 2013/102170 | | 7/2013 | |
| WO | 2013/106597 | | 7/2013 | |

* cited by examiner 14, 15
16
13
17b
17a
17
2
18
6
8
10
4
21
22
9
20
23
5
24
25

METHOD FOR PRODUCING ABRASIVE PARTICLES

BACKGROUND OF THE INVENTION

The invention relates to a method for producing abrasive particles, and abrasive particles produced according to the method. The invention furthermore relates to a method for producing a grinding tool for machining metallic materials as well as the grinding tool produced according to this method.

Different methods for producing abrasive particles are known from the state of the art. For example, in the applicant's EP 3 342 839 A1 a method is disclosed in which abrasive particles with a non-uniform shape and/or size are produced by chipping an extrudate. The objective in this method is to produce abrasive particles with an irregular geometry.

There, a disadvantage is that only relatively few abrasive particles can be produced in a particular time.

Furthermore, such a method results in a relatively high wear, as the cutting edges used for the chipping are subjected to a high load and thus wear relatively quickly.

SUMMARY OF THE INVENTION

The object of the present invention is to specify a method for producing abrasive particles which avoids the above-named problems, the abrasive particles produced therewith, a method for producing a grinding tool for machining metallic materials in which the abrasive particles produced according to the invention are used, as well as a grinding tool produced by means of this method.

In a method according to the invention, therefore, the extrudate and/or the intermediate particles is or are subjected to an energy input that is asymmetric with respect to the geometry of the extrudate and/or the intermediate particles.

Because of the asymmetric energy input, an asymmetric heating of the extrudate and/or the intermediate particles occurs. As the extrudate and/or the intermediate particles do not cool evenly because of the asymmetric, thus irregular, heating, stresses occur inside the extrudate and/or the intermediate particles. These stresses lead to a twisting of the extrudate and/or of the intermediate particles and thus to abrasive particles with an irregular geometry.

Compared with methods known from the state of the art, more abrasive particles can be produced in the same amount of time, since several extrudate strands can be provided for example. In addition, the wear is less in a method according to the invention than in the state of the art, as no chipping device is needed.

It may be pointed out that the technique of converting a starting mixture containing at least aluminum hydroxide at least into aluminum oxide by heat treatment has already been known for quite some time. In this connection, reference may be made to the so-called "sol-gel process". There, a starting mixture which contains at least aluminum hydroxide is used. Aluminum hydroxide can be present in different modifications. In connection with the present invention, powdered boehmite (γ-AlOOH) is preferably used. Further preferably, the boehmite is subsequently converted into a clear sol by the addition of water and the admixture of a peptizer, e.g. nitric acid. Then, through the further addition of an acid, e.g. nitric acid, or a nitrate solution, a reaction to form the gel, i.e. a dehydration and polymerization, is preferably initiated. Because of the gel formation, the boehmite is present in a very homogeneous distribution. In a subsequent work step, water released can be evaporated. In the course of a following heat treatment at a temperature of between 400° C. and 1200° C., preferably at a temperature of between 800° C. and 1000° C., the aluminum hydroxide can be converted into an aluminum oxide of the transition phase $\gamma\text{-}Al_2O_3$. In the reaction of boehmite to form aluminum oxide, nitrogen is released as residue of the acid and water. This low-temperature combustion is also called calcination. In a last step, a further heat treatment in the form of, preferably pressureless, sintering can then be carried out. This step is preferably effected at a temperature of between 1200° C. and 1800° C., particularly preferably at a temperature of between 1200° C. and 1500° C. Depending on the starting mixture, it can happen that secondary phases, such as e.g. spinel, form in addition to aluminum oxide (typically as alpha-aluminum oxide). Allowance is made for this circumstance by the expression "at least into aluminum oxide".

By "extrusion" is meant a process technology in which solid to viscous hardenable materials are continuously pressed out of a shaping opening under pressure. In the process, bodies with a cross section of the opening form, called extrudate.

In the present case, the cross section of the extrudate depends on a nozzle body used and is preferably rectangular, square, trapezoidal, parallelogram-shaped, triangular, drop-shaped, propeller-shaped or star-shaped and/or has at least one convex side or at least one concave side.

Not only is the method according to the invention for producing abrasive particles characterized by its simplicity and the lower maintenance requirement and wear compared with the state of the art, but it also makes it possible to vary the shape and/or size of the intermediate particles or of the abrasive particles present after the sintering easily and flexibly by replacement of a nozzle body and/or alterations during the separation.

One possibility for influencing or controlling the dimensions of the abrasive particles is to supply the extrudate to the method step of separation with an alterable infeed speed and/or in an oscillating motion. In the case of an oscillating motion, a particular length of the extrudate to be separated arises.

Furthermore, the intermediate particles generated by the separation can be comminuted before the heat treatment in a further method step, preferably by a cutting device. Instead of a cutting device, other comminution devices which, for example, also bring about a breaking and/or chopping of the intermediate particles can also be used.

A further possibility for influencing the shape and/or size of the abrasive particles is obtained by altering the consistency of the starting mixture. For this, during the provision of the starting mixture and/or during the extrusion of the starting mixture water, a peptizer, preferably nitric acid, and/or additives, for example an acid, which can likewise be nitric acid, and/or cobalt nitrate, are added.

Particularly preferably, the extrudate and/or the intermediate particles have a longitudinal direction, and the asymmetric energy input is effected transverse to the longitudinal direction.

On the one hand this favors a twisting of the extrudate and/or of the intermediate particles and on the other hand it makes a simple realization of an asymmetric energy input possible.

Advantageous embodiments of the method for producing abrasive particles furthermore consist in that in the course of the heat treatment the intermediate particles generated by the separation are calcined, preferably at a temperature of between 400° C. and 1200° C., particularly preferably at a temperature of between 800° C. and 1000° C., and/or are sintered, preferably at a temperature of between 1200° C. and 1800° C., particularly preferably at a temperature of between 1200° C. and 1500° C. As a supplement, it can be provided that in the course of the heat treatment the intermediate particles generated by the separation are pre-dried before the calcination and/or sintering, preferably at a temperature of between 50° C. and 350° C., particularly preferably at a temperature of between 80° C. and 100° C.

As previously stated, protection is also sought for a method for producing a grinding tool for machining metallic materials, wherein abrasive particles which were produced according to the method according to the invention for producing the abrasive particles are incorporated in a bond, for example in a ceramic bond or in a resinoid bond. A grinding tool with a porosity of from 2 to 50% and/or a density of from 1.5 to 4.5 g/cm$^3$ advantageously results thereby.

BRIEF DESCRIPTION OF THE DRAWINGS

Further details and advantages of the present invention will be explained in more detail below with reference to the drawings, in which.

DETAILED DESCRIPTION OF THE INVENTION

Figure 1:
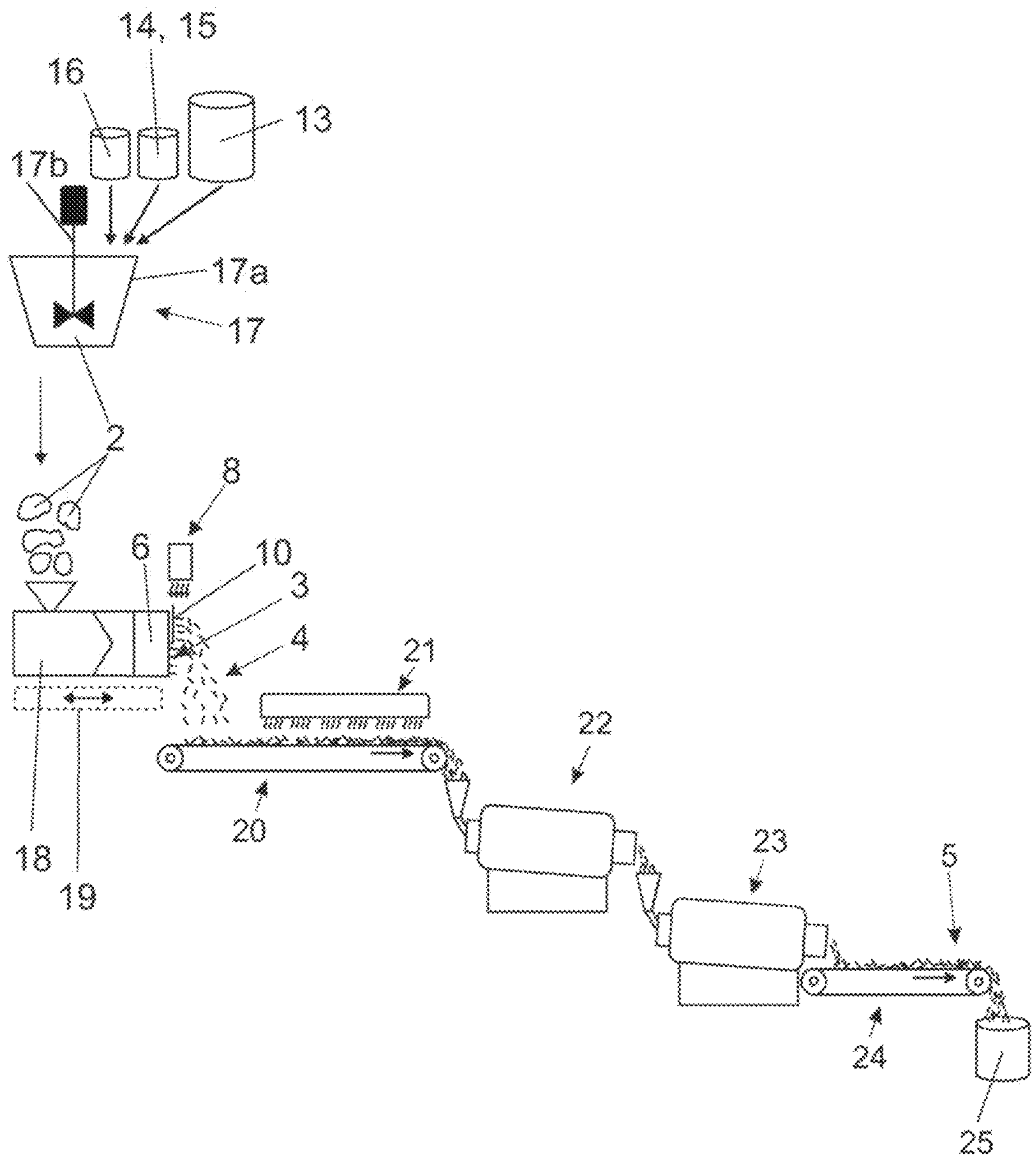
FIG. 1 shows a first embodiment of the method according to the invention for producing abrasive particles.

In the first embodiment, represented in FIG. 1, of the method according to the invention for producing abrasive particles, a starting mixture 2 is provided by introducing boehmite 13, water 14, nitric acid 15 and additives 16, for example cobalt nitrate, into a mixer 17, wherein the mixer 17 substantially consists of a mixing tank 17*a* and a rotating unit 17*b* arranged therein.

The starting mixture 2 provided in this way is subsequently supplied to an extrusion device 18. The extrusion device 18 can be arranged on a platform 19, which can be set in an oscillating motion. This oscillating motion is indicated schematically by a double arrow in FIG. 1.

The extrudate 3 leaving the extrusion device 18 has a particular cross-sectional shape which is determined by a nozzle body 6.

In this first embodiment, a device for asymmetric energy input 8 is arranged directly after the nozzle body 6 and subjects the intermediate particles 4 to an asymmetric energy input. However, the device for asymmetric energy input 8 can also be arranged in other positions, for example in the region of a belt guiding device 20.

The asymmetric energy input by the device for asymmetric energy input 8 can be effected, among other things, by

- contact with at least one heating device, preferably wherein the at least one heating device is formed plate-shaped at least in regions, and/or
- introduction of an electric current into the extrudate 3 and/or the intermediate particles 4, wherein at least a part of an energy of the electric current is converted into heat by an electrical resistance of the extrudate 3 and/or the intermediate particles 4, and/or
- convection, preferably by means of a fan heater device, and/or
- action of an electromagnetic radiation, preferably wherein the electromagnetic radiation has at least a wavelength of between 780 nm and 1 mm or 380 nm and 100 nm, and/or is emitted by at least one laser or a radiant heater, and/or
- by induction, wherein ferromagnetic particles are incorporated in the starting mixture 2 to be extruded.

It can also be provided that the device for asymmetric energy input 8 is formed as a drum or roller.

Furthermore, the device for asymmetric energy input 8 can in principle be arranged in any desired position between extrusion device 18 and sintering furnace 23.

The extrudate 3 is subsequently separated by a separator 10 formed as a rotating or oscillating blade. The separation into intermediate particles can also be effected by at least one laser or at least one water jet cutter or at least one plasma cutter, preferably wherein the extrudate 3 to be separated by the at least one laser or the at least one water jet cutter or the at least one plasma cutter is deposited on a conveyor before the separation.

The intermediate particles 4 generated by the separation of the extrudate 3 are supplied to a pre-drying device 21 by a belt guiding device 20.

The pre-dried intermediate particles 4 are then transferred to a calcining furnace 22, in which a calcination of the intermediate particles 4 is effected.

After the calcination, a sintering furnace 23 follows, in which the intermediate particles 4 are sintered to form abrasive particles 5. The shape and/or size of the abrasive particles 5 produced in this way will be discussed in more detail with reference to FIGS. 5*a* and 5*b*.

Instead of three spatially separated, successive devices 21, 22 and 23 for heat treatment, one integrated device for heat treatment can also be used, for example a tunnel furnace, with temperature zones which are controllable independently of each other.

The sintered abrasive particles 5 are positioned on a belt guide 24. During the transport by means of this belt guiding device 24, the abrasive particles 5 generated by the sintering are cooled.

The finished abrasive particles 5 are then transferred to a storage device 25 and are available for a further processing, for example for a method for producing a grinding tool for machining metallic materials.

Figure 2:
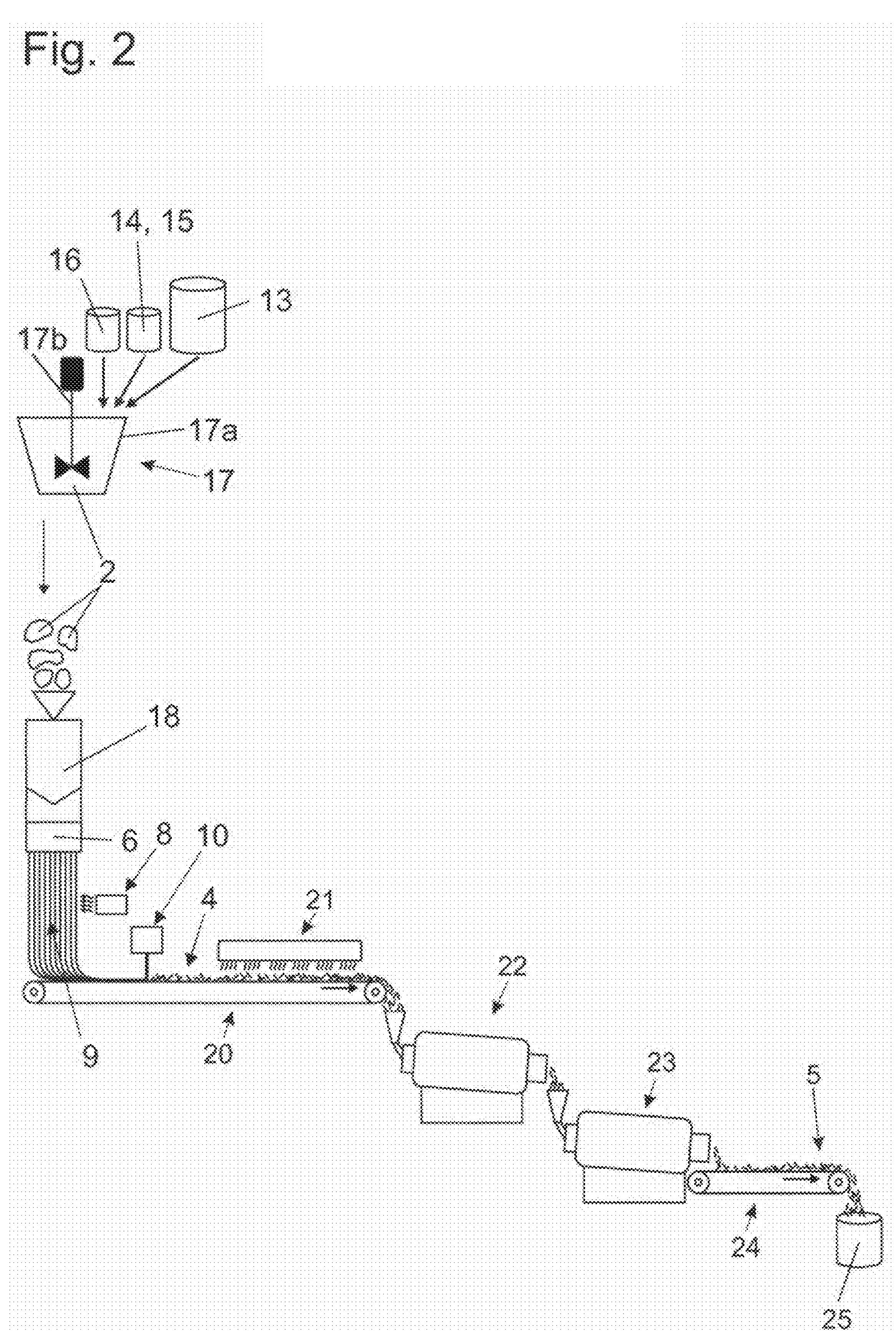
FIG. 2 shows a second embodiment of the method according to the invention for producing abrasive particles.

A second embodiment of the method according to the invention is represented in FIG. 2. The embodiments differ substantially only by the position of the device for asymmetric energy input 8 and the separator 10.

It can be seen that the extrusion device 18 is rotated and the extrudate 3 exits from the nozzle body 6 in the direction of gravitational acceleration in the form of several extrudate strands 9. The device for asymmetric energy input 8 is arranged such that it subjects the extrudate strands 9 hanging downwards due to the weight force to an asymmetric heat input. The extrudate 3 is thus subjected to an asymmetric heat input, and the intermediate particles 4 are not.

The extrudate 3 subjected to an asymmetric heat input is then deposited on a belt guiding device 20 and separated by a separator 10.

The rest of the method according to the invention according to the second embodiment example proceeds analogously to the first embodiment example, shown in FIG. 1.

Figure 3:
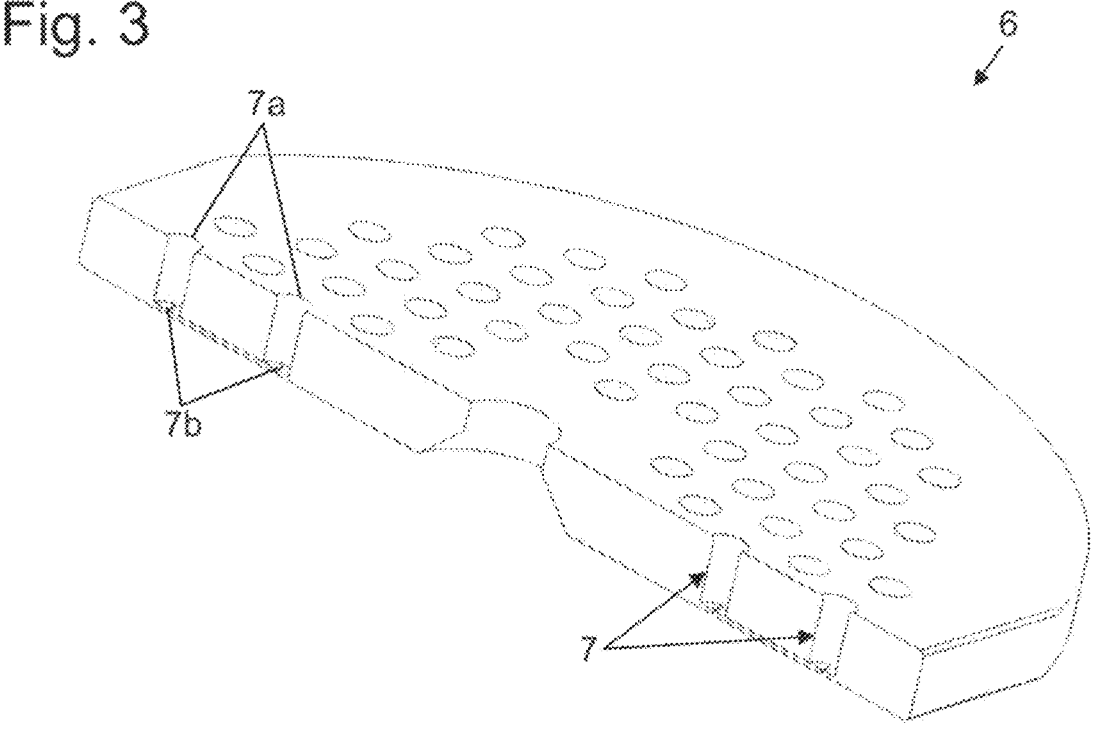
FIG. 3 shows an embodiment of a nozzle body in a sectional representation.
Figure 4A:
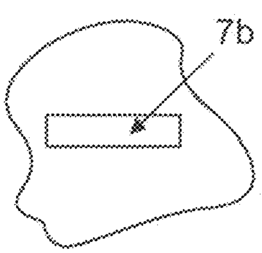
FIGS. 4*a*-*l* are schematic representations of outlet openings of nozzle channels of a nozzle body according to the invention, FIGS. 5*a*/5*b* are photographs of abrasive particles which were produced according to a preferred embodiment example of the method according to the invention for producing abrasive particles.
Figure 4B:
Figure 4C:
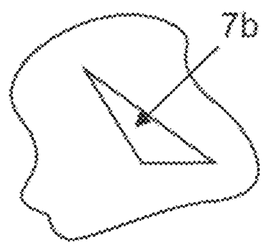
Figure 4D:
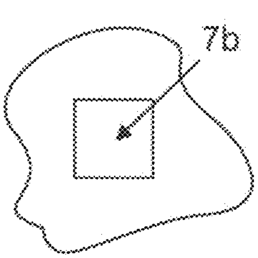
Figure 4E:
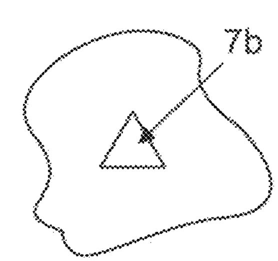
Figure 4F:
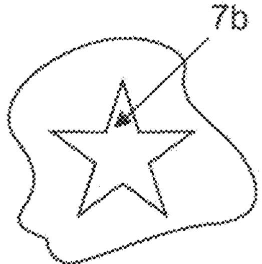
Figure 4G:
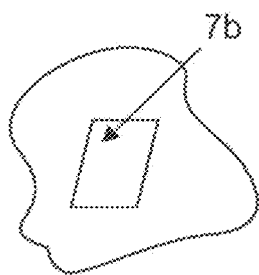
Figure 4H:
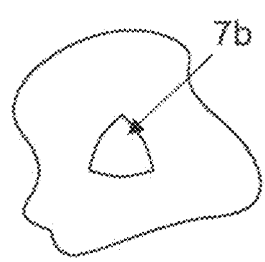
Figure 4I:
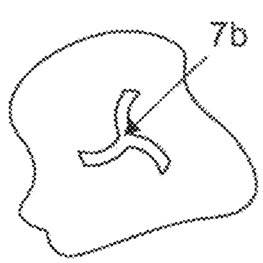
Figure 4J:
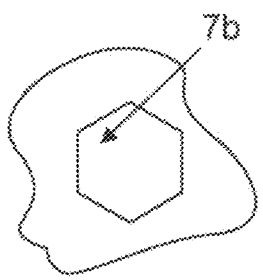
Figure 4K:
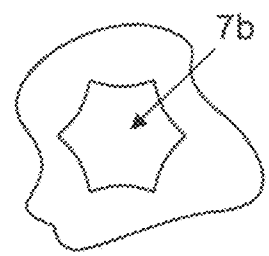
Figure 4L:
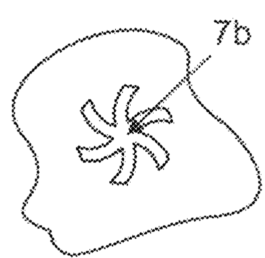

FIG. 3 shows an embodiment of a nozzle body 6 in a sectional representation. It can be seen that the nozzle channels 7 are formed substantially cylindrical and have the same diameter as the inlet opening 7*a*.

In the case of a nozzle body 6 according to FIG. 3, a starting mixture 2 to be extruded thus enters the nozzle body 6 through the inlet openings 7*a* and, through the outlet opening 7*b*, undergoes an increase in its density and/or its speed.

The mixture 2 to be extruded then exits from the nozzle body 6 through the outlet openings 7*b* as extrudate 3. The outlet openings 7*b* in this embodiment resemble a three-blade rotor in terms of their shape.

A nozzle body 6 according to FIG. 3 can be produced using an additive manufacturing method or using at least a material removal manufacturing method.

In the case of a material removal manufacturing, it could be provided for example that blind holes are introduced into a metallic blank. Outlet openings 7*b* could then be cut into these blind holes by means of laser cutting. However, any other suitable manufacturing method can also be provided.

FIGS. 4*a* to 4*l* show schematic representations of outlet openings 7*b* of nozzle channels 7 of a nozzle body 6. It is apparent that the outlet openings 7*b* can have a wide variety of geometric shapes. The outlet openings 7*b* represented in FIGS. 4*a* to 4*l* are only to serve as examples, in principle all suitable geometric shapes are conceivable for the outlet openings 7*b*.

The shape of the outlet openings 7*b* also determines the cross-sectional shape of the extrudate 3 and therefore the cross-sectional shape of the intermediate particles 4 and abrasive particles 5.

Figure 5A:
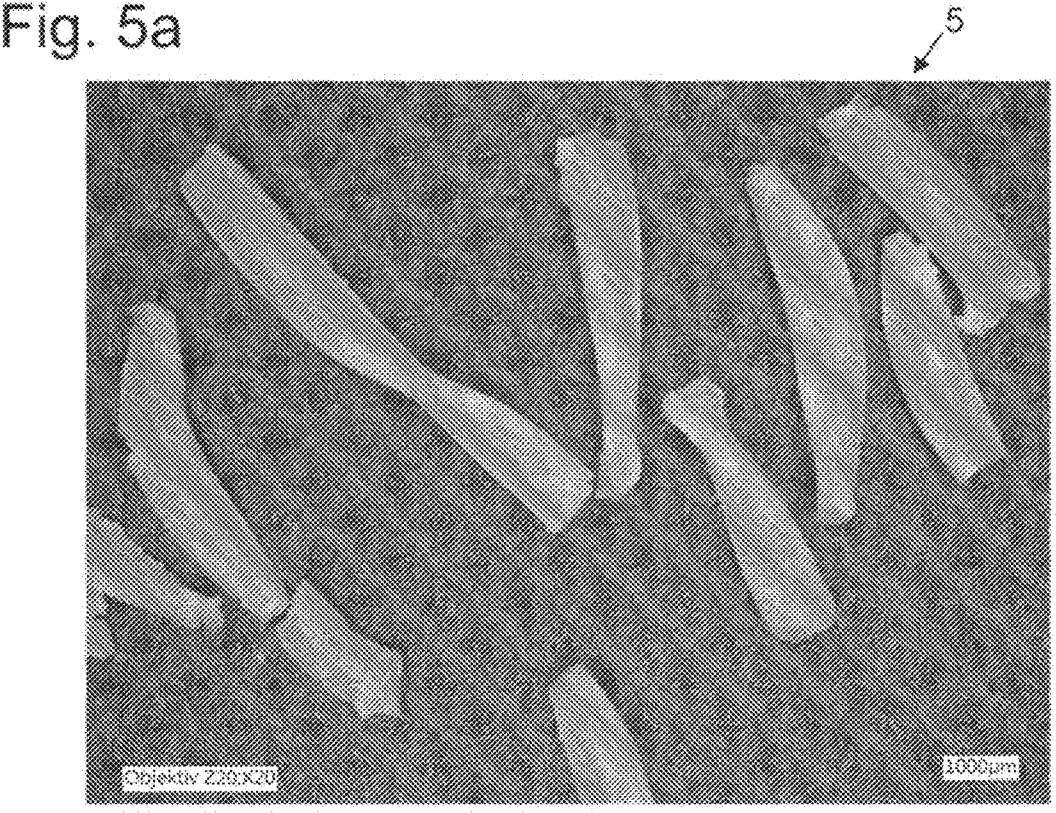
Figure 5B:
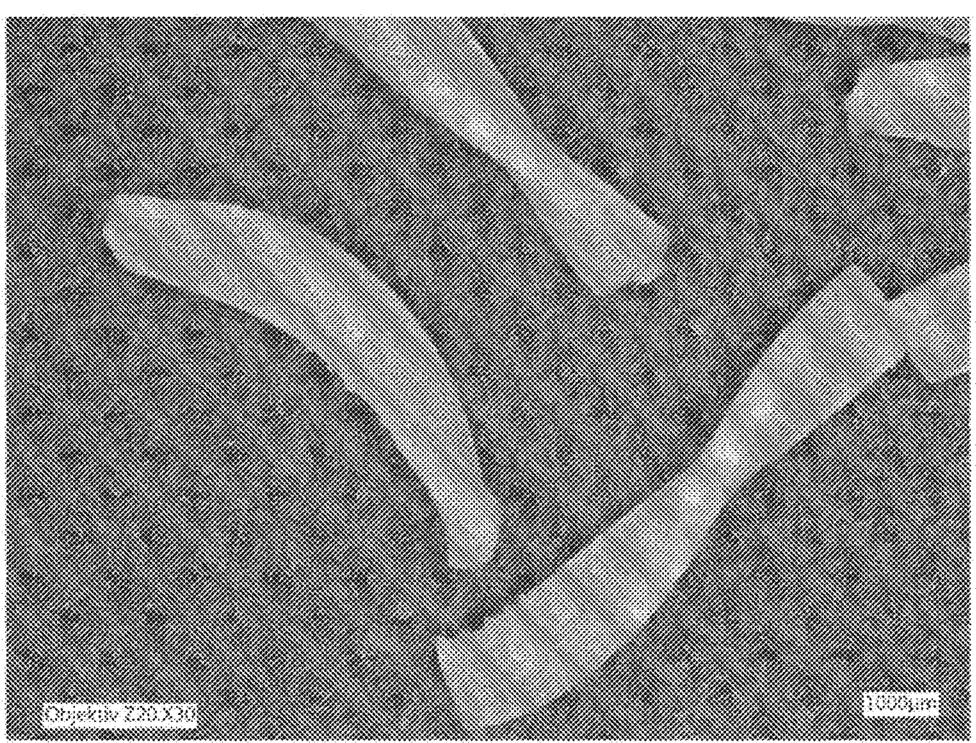

FIGS. 5*a* and 5*b* show photographs of abrasive particles which were produced according to a method according to the invention for producing abrasive particles 5. With reference to the photographs, the size and shape of the abrasive particles 5 are apparent. It can be seen that a majority of the abrasive particles 5 from the photographed sample have a twist angle of from 90° to 180°. In particular, however, the abrasive particles 5 can have a twist angle of up to 360°.

Figure 6A:
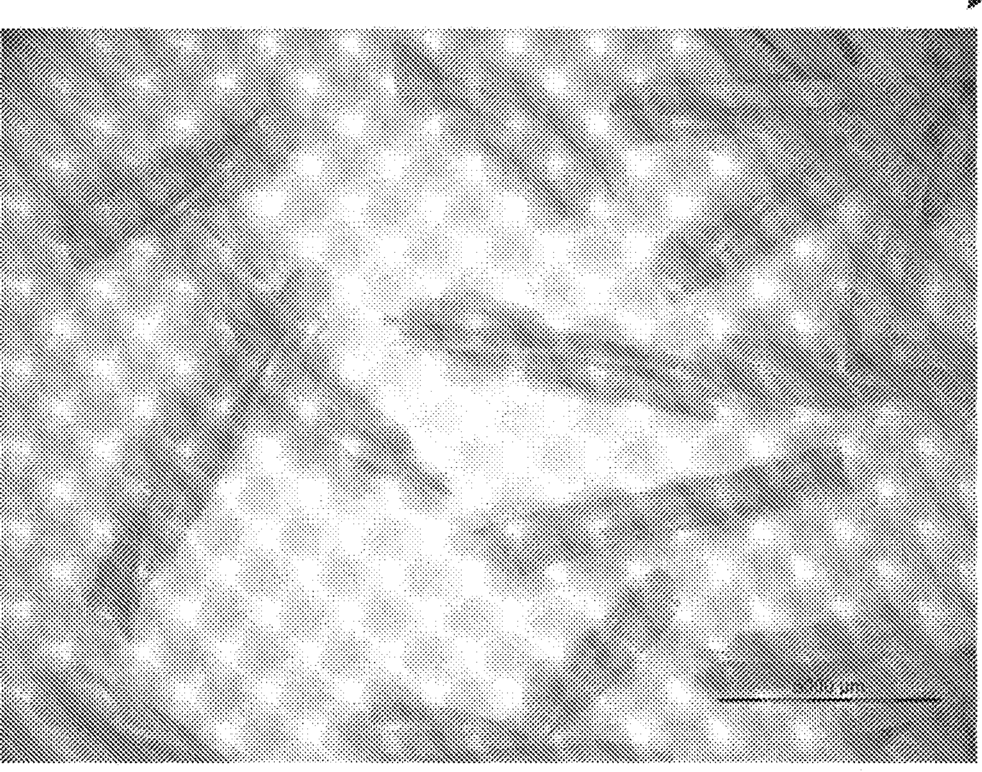
FIG. 6*a* is a photograph of abrasive particles which were produced according to an embodiment example of the method according to the invention for producing abrasive particles.

FIG. 6*a* shows a photograph of abrasive particles which were produced according to a method according to the invention for producing abrasive particles 5 with an embodiment of a nozzle body according to FIG. 3. With reference to the photograph, the size and shape of the abrasive particles 5 are apparent.

It can be seen that a majority of the abrasive particles 5 from the photographed sample have a twist angle of from 90° to 180°. In particular, however, it can be provided that the abrasive particles 5 have a twist angle of up to 360°.

Figure 6B:
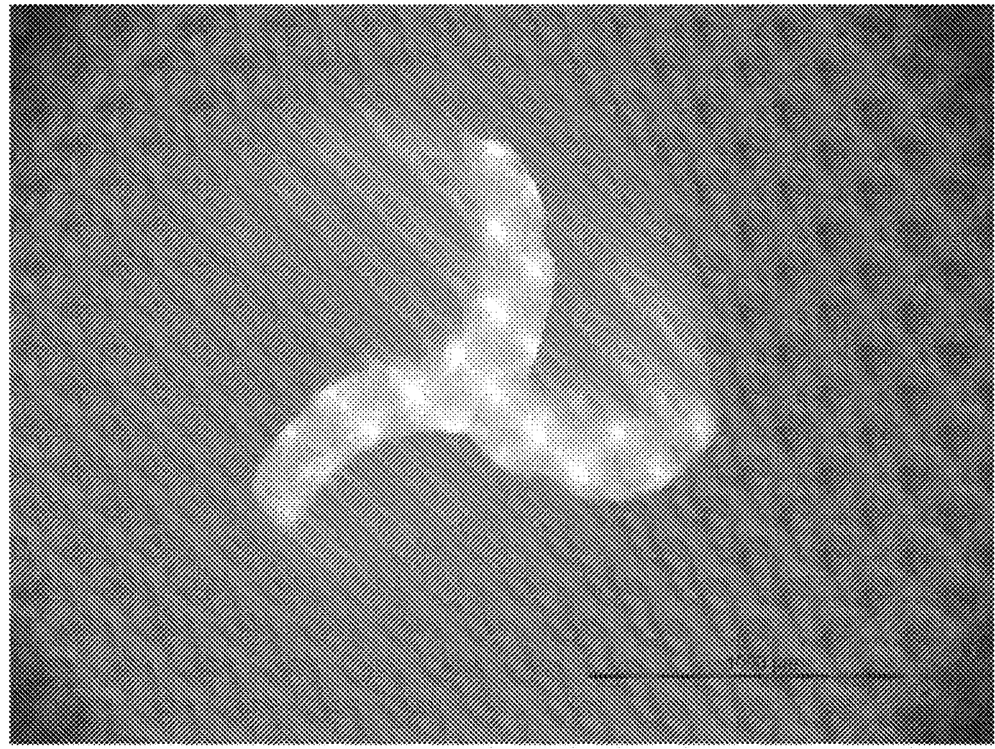
FIG. 6*b* is a photograph, in a front view, of an abrasive particle which was produced according to an embodiment example of the method according to the invention for producing abrasive particles.

FIG. 6*b* shows a photograph, in a front view, of an abrasive particle which was produced according to a method according to the invention for producing abrasive particles 5 with an embodiment of a nozzle body according to FIG. 3. With reference to the photograph, the size of an abrasive particle and its cross section can be seen.

LIST OF REFERENCE NUMBERS

1 method
2 starting mixture
3 extrudate
4 intermediate particles
5 abrasive particles
6 nozzle body
7 nozzle channels
  7*a* inlet opening
  7*b* outlet opening
  7*c* funnel-shaped section
  7*d* twisted section
8 device for asymmetric energy input
9 extrudate strand
10 separator
11 conveyor
12 grinding tool
13 boehmite
14 water
15 nitric acid
16 additives
17 mixer
  17*a* mixing tank
  17*b* rotating unit
18 extrusion device
19 platform
20 belt guiding device
21 pre-drying unit
22 calcining furnace
23 sintering furnace
24 belt guiding device
25 storage device

The invention claimed is:

1. A method of producing abrasive particles, the method comprising:

providing a starting mixture containing aluminum hydroxide convertible into at least aluminum oxide by heat treatment, extruding the starting mixture to form an extrudate, separating the extrudate into intermediate particles, and heat-treating the intermediate particles, wherein the intermediate particles are converted into abrasive particles containing aluminum oxide, wherein at least one of the extrudate and the intermediate particles is subjected to an energy input asymmetric with respect to a geometry of the at least one of the extrudate and the intermediate particles.

2. The method according to claim 1, wherein the asymmetric energy input is effected at an outlet opening of a nozzle body of an extrusion device and/or on a belt guiding device and/or in a device for asymmetric energy input.

3. The method according to claim 2, wherein the asymmetric energy input is effected at the outlet opening of the nozzle body of the extrusion device such that an extrudate strand hanging downwards under influence of gravity is subjected to the asymmetric energy input.

4. The method according to claim 2, wherein the asymmetric energy input is effected in the device for asymmetric energy input comprising a drum and/or roller.

5. The method according to claim 1, wherein the peptizer is nitric acid, and the additives include an acid and/or cobalt nitrate.

6. The method according to claim 1, wherein the asymmetric energy input:

is effected by contact with a heating device, and/or is effected by introduction of an electric current into the extrudate and/or the intermediate particles, wherein at least a part of an energy of the electric current is converted into heat by an electrical resistance of the extrudate and/or the intermediate particles, and/or is effected by convection, and/or is effected by action of an electromagnetic radiation, and/or is effected by induction, wherein ferromagnetic particles are incorporated in the starting mixture to be extruded.

7. The method according to claim 6, wherein the asymmetric energy input:

is effected by contact with the heating device formed at least partially plate-shaped, and/or is effected by a fan heater device, and/or is effected by action of the electromagnetic radiation.

8. The method according to claim 7, wherein the wavelength of the electromagnetic radiation is:

between 780 nm and 1 mm or 380 nm and 100 nm, and/or emitted by a laser or a radiant heater.

9. The method according to claim 1, wherein the extrudate and/or the intermediate particles have a longitudinal direction and the asymmetric energy input is effected in a direction transverse to the longitudinal direction.

10. The method according to claim 1, wherein, during the extruding, the starting mixture is pressed through a nozzle body with a nozzle channel.

11. The method according to claim 10, wherein the nozzle channel is one of a plurality of nozzle channels running substantially parallel, and the nozzle body is produced using an additive manufacturing method.

12. The method according to claim 10, wherein the nozzle channel of the nozzle body has an inlet opening, through which the starting mixture enters the nozzle channel, and an outlet opening having a convex side or a concave side via which the extrudate exits from the nozzle channel.

13. The method according to claim 12, wherein the inlet opening is circular or elliptical, and the outlet opening is rectangular, square, triangular, drop-shaped, or star-shaped.

14. The method according to claim 10, wherein the nozzle channel has a funnel-shaped section following the inlet opening with a diameter decreasing in a direction of the outlet opening, whereby the pressure, the density, and/or the speed of the starting mixture to be extruded is increased.

15. The method according to claim 1, wherein the extrudate is separated into intermediate particles by a separator and/or by a laser, and/or by a water jet cutter, and/or by a plasma cutter.

16. The method according to claim 15, wherein the separator is a rotating or oscillating blade, and the extrudate to be separated by the separator is deposited on a conveyor before the separation.

17. The method according to claim 1, wherein, during the heat treatment, the intermediate particles generated by the separation:

are calcined, and/or are sintered.

18. The method according to claim 17, wherein, during the heat treatment, the intermediate particles generated by the separation are pre-dried before the calcination and/or sintering.

19. The method according to claim 18, wherein the pre-drying of the intermediate particles before the calcination and/or the sintering is performed at a temperature of between 50° C. and 350° C.

20. The method according to claim 19, wherein the pre-drying of the intermediate particles before the calcination and/or the sintering is performed at a temperature of between 80° C. and 100° C.

21. The method according to claim 17, wherein:

the calcination is performed at a temperature of between 400° C. and 1200° C., and/or the sintering is performed at a temperature of between 1200° C. and 1800° C.

22. The method according to claim 1, further comprising cooling the abrasive particles present after the heat treatment.

23. The method according to claim 1, wherein, during the providing of the starting mixture and/or during the extruding of the starting mixture, water, a peptizer and/or additives are added to the starting mixture.

* * * * *